(12) United States Patent
Wong et al.

(10) Patent No.: US 11,969,036 B2
(45) Date of Patent: Apr. 30, 2024

(54) EMBOSSMENTS FOR THIN FILM ARTICLES

(71) Applicant: TOP GLOVE INTERNATIONAL SDN. BHD., Klang (MY)

(72) Inventors: Chong Ban Wong, Klang (MY); Kon Fah Hue, Klang (MY); Ah Chye Ong, Klang (MY); Tong Aun Ng, Klang (MY); Yoke Meng Tan, Klang (MY); Shi Tian Lim, Klang (MY)

(73) Assignee: TOP GLOVE INTERNATIONAL SDN. BHD., Klang (MY)

( * ) Notice: Subject to any disclaimer, the term of this patent is extended or adjusted under 35 U.S.C. 154(b) by 779 days.

(21) Appl. No.: 17/027,135

(22) Filed: Sep. 21, 2020

(65) Prior Publication Data

US 2021/0345715 A1    Nov. 11, 2021

(30) Foreign Application Priority Data

May 6, 2020    (MY) .............................. 2020002241

(51) Int. Cl.
*A41D 19/00* (2006.01)
*A41D 19/015* (2006.01)
(Continued)

(52) U.S. Cl.
CPC ..... *A41D 19/0058* (2013.01); *A41D 19/0062* (2013.01); *A41D 19/0082* (2013.01);
(Continued)

(58) Field of Classification Search
None
See application file for complete search history.

(56) References Cited

U.S. PATENT DOCUMENTS 2,049,323 A * 7/1936 Schmidt .................... D06F 1/00
                                                  2/168
4,084,265 A * 4/1978 Anfelt .............. A41D 19/01547
                                                  2/163
(Continued)

FOREIGN PATENT DOCUMENTS

CN       203662070 U  *  6/2014
CN       203913492 U  * 11/2014
(Continued)

OTHER PUBLICATIONS

Machine Translation of WO-2017126192-A1, Jul. 2017 (Year: 2017).*

(Continued)

*Primary Examiner* — Jeffrey A Vonch
(74) *Attorney, Agent, or Firm* — Workman Nydegger

(57) ABSTRACT

An embossment (100) on a sheet of film and a glove produced from the embossed sheet of film is disclosed. The embossment (100) comprises a base surface (103); a raised surface (102) opposite to the base surface (103); and at least one recessed area (104) formed therein and extending from the base surface (103) and the raised surface (102) to the base surface (103), wherein depth ($D_r$) of the recessed area (104) is between 50% to 99% relative to height ($H_e$) of the embossment (100) between the base surface (103) and the raised surface (102).

8 Claims, 3 Drawing Sheets

(51) Int. Cl.
- *B29C 48/00* (2019.01)
- *B29C 48/08* (2019.01)
- *B29C 65/02* (2006.01)
- *B29K 21/00* (2006.01)
- *B29L 31/48* (2006.01)

(52) U.S. Cl.
CPC ...... *A41D 19/01547* (2013.01); *B29C 48/002* (2019.02); *B29C 48/022* (2019.02); *B29C 48/08* (2019.02); *B29C 65/02* (2013.01); *A41D 19/01558* (2013.01); *A41D 2500/52* (2013.01); *B29K 2021/003* (2013.01); *B29L 2031/4864* (2013.01); *Y10T 428/1386* (2015.01); *Y10T 428/1397* (2015.01); *Y10T 428/24479* (2015.01); *Y10T 428/24628* (2015.01)

(56) References Cited

U.S. PATENT DOCUMENTS

| | | | |
|---|---|---|---|
| 4,852,586 A * | 8/1989 | Haines | A61F 6/04 128/842 |
| 5,098,755 A * | 3/1992 | Tanquary | B29C 59/022 428/161 |
| 5,421,033 A * | 6/1995 | DeLeo | A41D 19/0062 2/161.7 |
| 5,581,811 A * | 12/1996 | Cohen | A41D 19/01505 2/167 |
| 5,983,395 A * | 11/1999 | Lei | A41D 19/0055 2/163 |
| 6,081,928 A * | 7/2000 | Bourne | A41D 19/0055 2/163 |
| 6,962,739 B1 | 11/2005 | Kim et al. | |
| 7,310,826 B2 | 12/2007 | Kishihara | |
| 7,356,852 B2 | 4/2008 | Thai | |
| 7,504,145 B2 | 3/2009 | Vance et al. | |
| 7,788,737 B2 | 9/2010 | Baker et al. | |
| 7,833,619 B2 | 11/2010 | Frantellizzi | |
| 8,065,750 B2 | 11/2011 | Dassler et al. | |
| 8,225,427 B2 | 7/2012 | Bevier | |
| 8,387,167 B2 | 3/2013 | Matsunobu et al. | |
| 8,495,764 B2 | 7/2013 | Hull | |
| 8,522,363 B2 | 9/2013 | Hassan et al. | |
| 8,938,814 B2 | 1/2015 | Tomono | |
| 9,266,263 B1 | 2/2016 | Jaeger | |
| 9,622,524 B2 | 4/2017 | VanErmen et al. | |
| 9,730,477 B2 | 8/2017 | Furlong | |
| 9,788,585 B2 | 10/2017 | Thompson et al. | |
| 10,149,504 B2 | 12/2018 | Kassam et al. | |
| 10,292,440 B2 | 5/2019 | Fernando et al. | |
| 10,349,690 B2 | 7/2019 | Francisco Costa et al. | |
| 10,405,593 B2 | 9/2019 | Megat Abdul Aziz et al. | |
| 10,408,294 B2 | 9/2019 | Plant | |
| 10,433,924 B2 | 10/2019 | Bluecher et al. | |
| 10,602,788 B2 | 3/2020 | Hull et al. | |
| 2001/0044950 A1 * | 11/2001 | Sajovic | A41D 19/01547 2/168 |
| 2004/0025226 A1 * | 2/2004 | Jaeger | A41D 19/01558 2/161.6 |
| 2006/0041991 A1 * | 3/2006 | Kim Sim | A41D 19/0062 2/168 |
| 2006/0282936 A1 * | 12/2006 | Olson | A41D 19/01558 2/161.7 |
| 2012/0017343 A1 | 1/2012 | Roberts | |
| 2013/0152943 A1 * | 6/2013 | Nguyen | A61F 6/04 425/269 |
| 2015/0164160 A1 * | 6/2015 | Furlong | A41D 19/01547 2/169 |
| 2016/0120242 A1 | 5/2016 | Thompson et al. | |
| 2018/0125130 A1 | 5/2018 | Ju | |
| 2018/0125132 A1 | 5/2018 | Wong et al. | |
| 2018/0153237 A1 | 6/2018 | Karall | |
| 2018/0184732 A1 | 7/2018 | Plant | |
| 2018/0318697 A1 | 11/2018 | Ramirez | |
| 2018/0360143 A1 | 12/2018 | Williams et al. | |
| 2018/0369060 A1 | 12/2018 | Whittle | |
| 2019/0069618 A1 * | 3/2019 | Williams | A41D 19/0068 |
| 2019/0098945 A1 | 4/2019 | Lim | |
| 2019/0191955 A1 | 6/2019 | Ji | |
| 2021/0197441 A1 * | 7/2021 | Hue | B29C 59/04 |

FOREIGN PATENT DOCUMENTS

| | | | | |
|---|---|---|---|---|
| EP | 824896 A1 * | 2/1998 | | A41D 19/0062 |
| GB | 428249 A | 5/1935 | | |
| GB | 1473744 A * | 5/1977 | | A41D 19/01564 |
| JP | 49072428 U | 6/1974 | | |
| JP | 57106711 U | 7/1982 | | |
| JP | 60252702 A * | 12/1985 | | |
| JP | 03269103 A * | 11/1991 | | |
| JP | 06101104 A * | 4/1994 | | B29C 66/43 |
| JP | 10193454 A * | 7/1998 | | |
| JP | 2000355809 A * | 12/2000 | | |
| JP | 2003055821 A * | 2/2003 | | |
| JP | 2013166317 A * | 8/2013 | | |
| JP | 2014009316 A * | 1/2014 | | |
| JP | 2018100460 A * | 6/2018 | | |
| KR | 200259939 Y1 * | 1/2002 | | |
| KR | 200323316 Y1 * | 8/2003 | | |
| KR | 200323360 Y1 * | 8/2003 | | |
| KR | 200421477 Y1 * | 7/2006 | | |
| KR | 200460975 Y1 * | 6/2012 | | |
| KR | 200482181 Y1 * | 1/2017 | | |
| KR | 2017014403 A * | 2/2017 | | A41D 19/0055 |
| WO | WO-2017126192 A1 * | 7/2017 | | A43B 13/223 |
| WO | 2019018995 | 1/2019 | | |
| WO | WO-2019039932 A1 * | 2/2019 | | B29C 43/222 |
| WO | 2020000051 | 1/2020 | | |
| WO | 2020024358 | 2/2020 | | |
| WO | 2020064912 | 4/2020 | | |
| WO | 2020094966 | 5/2020 | | |
| WO | 2020122795 | 6/2020 | | |
| WO | WO-2021006719 A1 * | 1/2021 | | |
| WO | WO-2021177370 A1 * | 9/2021 | | |

OTHER PUBLICATIONS

Machine Translation of JP-2018100460-A, Jun. 2018 (Year: 2018).*
Machine Translation of WO-2021177370-A1, Sep. 2021 (Year: 2021).*
Machine Translation of CN-203662070-U, Jun. 2014 (Year: 2014).*

* cited by examiner

EMBOSSMENTS FOR THIN FILM ARTICLES

PRIORITY

The present application claims priority to Malaysian Patent Application No. PI2020002241, filed May 6, 2020, the disclosure of which is herein incorporated by reference in its entirety.

FIELD OF THE INVENTION

The present invention relates to embossments on thin film articles, in particular for thermoplastic elastomer (TPE) gloves for enhanced durability and gripping performance of the gloves.

BACKGROUND OF THE INVENTION

Gloves are known to be personal protective equipment (PPE) that ensure human hands are protected upon contact with particular objects, chemicals or living things. Numerous categories of gloves were invented to fit in various applications. Food handling industries are among the common sectors that have the need of using gloves wherein the gloves are introduced to protect human hands and food from cross contamination.

Four types of gloves that are common in the food industries are acrylonitrile butadiene rubber (NBR) glove, polyvinyl chloride (PVC) glove, thermoplastic elastomer (TPE) glove and polyethylene (PE) glove. In the terms of costing, durability, ergonomics and chemical hazards, each of the four gloves has its own pros and cons.

Compared to NBR glove and PVC glove, TPE glove has the most minimal chemical hazard but with slightly poorer durability and gripping performance. Two of the major drawbacks of TPE gloves are durability and gripping performance. There have been several attempts in the prior art to overcome poor durability and gripping performance related to the shortcomings of TPE gloves. Conventionally, overlapping textures or patterns were embossed on these gloves to overcome the aforementioned shortcomings. However, the overlapping textures or embossed patterns failed to provide a balance in both durability and gripping performance.

As such, there is a need to have embossments which enables thin film articles such as TPE gloves to have enhanced durability and gripping performance without increasing their manufacturing cost and overhead cost.

SUMMARY OF THE INVENTION

An embossment on a sheet of film is disclosed. The embossment comprises a base surface; a raised surface opposite to the base surface; and at least one recessed area formed therein and extending from the raised surface to the base surface, wherein depth of the recessed area is between 50% to 99% relative to height of the embossment between the base surface and the raised surface.

According to the invention, size of the embossment is between 0.10 mm and 10.00 mm and size of the recessed area is between 0.05 mm and 5.00 mm.

Typically, design of the embossment and the recessed area is selected from the group consisting of at least one pattern, at least one shape or combinations thereof.

Preferably, the pattern is selected from the group consisting of flower, wave, water drop, fish scale or a pattern simulating appearance of an abstract design, a living object or a non-living object whereas the shape is selected from the group consisting of circle, square, rectangle, diamond, hexagon, octagon or combinations thereof.

Alternatively, the depth of the recessed area is between 80% to 90% relative to the height of the embossment. Further, the recessed area is stepped.

Furthermore, thickness of the sheet of film before embossment is between 25 μm to 60 μm.

According to another aspect of the present invention, a glove produced from a sheet of film having at least one embossment is disclosed.

Additional aspects, features and advantages of the invention will become apparent to those skilled in the art upon consideration of the following detailed description of preferred embodiments of the invention in conjunction with the drawings listed below.

BRIEF DESCRIPTION OF THE ACCOMPANYING DRAWINGS

The present invention will be fully understood from the detailed description given herein below and the accompanying drawings which are given by way of illustration only, and thus are not limitative of the present invention, wherein:

DETAILED DESCRIPTION OF THE INVENTION

Detailed description of preferred embodiments of the present invention is disclosed herein. It should be understood, however, that the embodiments are merely exemplary of the present invention, which may be embodied in various forms. Therefore, the details disclosed herein are not to be interpreted as limiting, but merely as the basis for the claims and for teaching one skilled in the art of the invention. The numerical data or ranges used in the specification are not to be construed as limiting.

The present invention relates to embossments on a sheet of film. Particularly, the present invention proposes a new embossment to address poor durability and gripping performance of thin film articles produced from the sheet of film, such as gloves. Although the present invention explains application of the embossments for gloves, the teachings of the present invention can be applied for any article produced from a sheet of film using a cast extrusion method.

The embossment as proposed by the present invention is a three-dimensional design having a combination of patterns and/or shapes with varied sizes.

Figure 1:
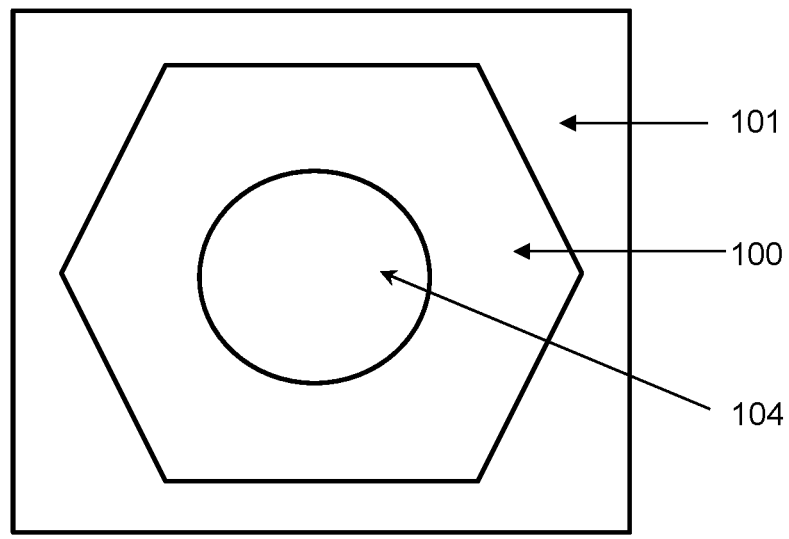
FIG. 1 is a top view of an exemplary embossment (hexagon and with circular recessed area in the middle) designed in accordance with the present invention.
Figure 2A:
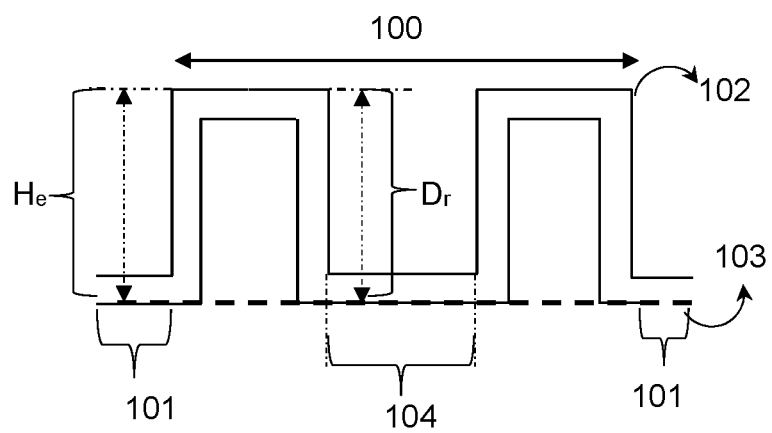
FIG. 2a is a cross-sectional illustration of the embossment on a sheet of film showing 100% depth of recessed area in accordance with the present invention.
Figure 2B:
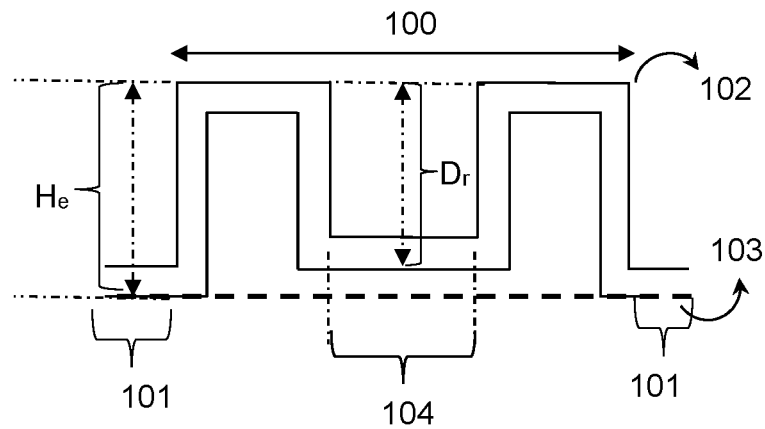
FIG. 2b is a cross-sectional illustration of the embossment on a sheet of film showing 80% depth of recessed area in accordance with the present invention.
Figure 3:
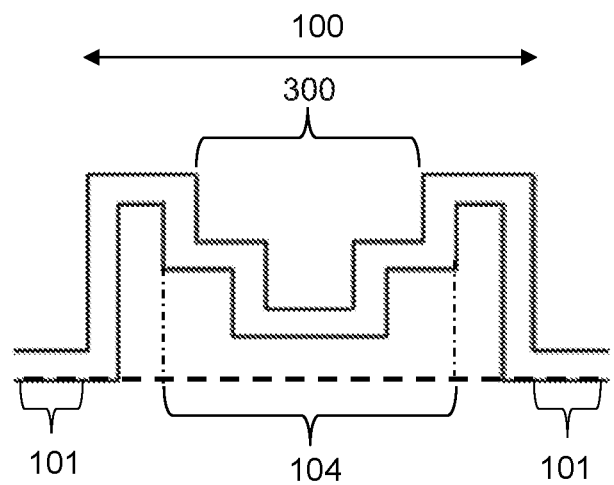
FIG. 3 is a cross-sectional illustration of the embossment on a sheet of film showing a recessed area with multiple steps in accordance with the present invention.
Figure 4:
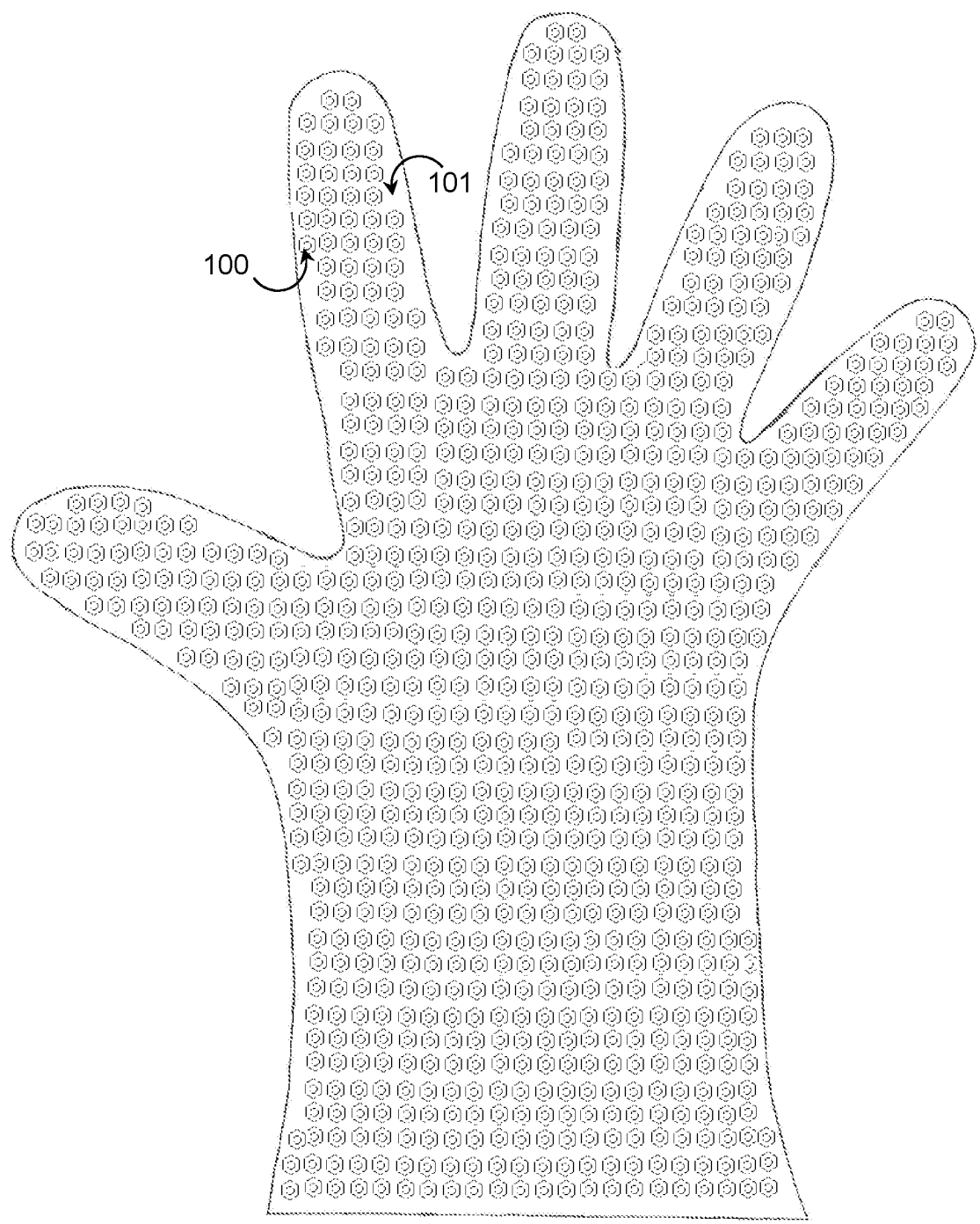
FIG. 4 depicts exemplary embossments produced on a thermoplastic elastomer (TPE) glove in accordance with the present invention.

Referring to the accompanying drawings, FIG. 1 presents a top view of an exemplary embossment designed in accordance with the present invention. FIGS. 2a and 2b present cross-sectional illustrations of an embossment on a sheet of film showing a recessed area. FIG. 3 presents a cross sectional illustration of an embossment on a sheet of film showing a recessed area with multiple steps. FIG. 4 presents exemplary embossments produced on a thermoplastic elastomer (TPE) glove.

Each of the features of the embossment will be explained in detail hereinafter. First feature of the present invention, which is presented in FIG. 1, discusses on a design of the embossment (100) which includes at least one pattern and/or at least one shape. The pattern is not limited to flower, wave, water drop, fish scale or any pattern simulating appearance of an abstract design, a living object or a non-living object whereas the shape is not limited to circle, square, rectangle, diamond, hexagon, octagon or combinations thereof. The size of the embossment (100) with the aforementioned pattern and/or shape ranges between 0.10 mm to 10.00 mm, still preferably between 0.30 mm to 2.00 mm. For example, as presented in FIG. 1, the embossment (100) on the sheet of film is represented as a hexagon.

The presence of at least one pattern and/or at least one shape in the embossment (100) provides a ploughing effect and prevents movement of an object when gripped using a TPE glove having one or more of the embossments according to the present invention. The ploughing effect is achieved as a result of uneven surface of the embossment (100). It also assists in enhancing grip performance when handling objects.

Referring to FIGS. 2a and 2b, the embossment (100) on the sheet of film comprises a base surface (103); a raised surface (102) opposite to the base surface (103); and at least one recessed area (104) formed therein and extending from the raised surface (102) to the base surface (103). If the embossment on the sheet of film is used to produce a TPE glove, then the dark dotted line in FIGS. 2a and 2b refers to the base surface (103) of the embossment (100) that will be in contact with an object and the raised surface (102) will be in contact with a user's hand.

According to a second feature of the present invention, the recessed area (104) is present for each of the patterns and/or shapes in the embossment (100). When the embossment (100) on the sheet of film is observed from a top view, the recessed area (104) appears to be formed within the embossment (100).

The recessed area (104) assists in providing extra contact surface area to the objects. The design of the recessed area (104) includes at least one pattern and/or at least one shape, wherein the pattern is not limited to flower, wave, water drop, fish scale or any pattern simulating appearance of an abstract design, a living object or a non-living object whereas the shape is not limited to circle, square, rectangle, diamond, hexagon and octagon or combinations thereof. The size of the recessed area (104) is smaller than the size of the embossment (100), ranging between 0.05 mm to 5.00 mm, still preferably between 0.07 mm to 1.00 mm. For example, as presented in FIG. 1, the recessed area (104) in the embossment (100) is represented as a circle.

Third feature of the present invention discloses that the recessed area (104) is stepped. A step in the recessed area (104) is represented by the depth ($D_r$) of the recessed area (104) which is typically between 50% to 99% relative to height ($H_e$) of the embossment (100), wherein height ($H_e$) of the embossment is the distance between the base surface (103) and the raised surface (102) of the embossment (100). Preferably, depth ($D_r$) of the recessed area (104) is between 80% to 90% relative to the height ($H_e$) of the embossment (100) in order to provide flexibility of controlling the durability and gripping performance of the thin film article, as seen in FIG. 2b. Alternatively, there may be more than one step introduced in the recessed area (104) as seen in FIG. 3. Hence, each recessed area (104) can have multiple steps (300) by controlling height of the steps.

FIG. 2a discloses a cross-sectional illustration of the embossment (100) in which the depth ($D_r$) of the recessed area (104) is equivalent to the height ($H_e$) of the embossment. In this scenario, the depth ($D_r$) of the recessed area (104) is 100% relative to height ($H_e$) of the embossment (100) which is undesirable for the present invention. On the other hand, FIG. 2b shows that the depth ($D_r$) of the recessed area (104) is 80% relative to the height ($H_e$) of the embossment.

The depth ($D_r$) of the recessed area (104) plays a vital role in providing flexibility of controlling the durability and gripping performance of the thin film article.

FIG. 4 shows a TPE glove produced from a sheet of film having embossment (100) prepared according to the present invention. Two or more embossments (100) on the glove are separated by a non-embossed area (101) as seen in FIGS. 1 to 4. The non-embossed area (101) contributes in increasing the surface area that is in contact with an object.

The combination of all three features introduces a three-dimensional design of embossment which further expands the possibility of incorporating various new features into the thin film article, especially into the TPE glove and providing it with enhanced durability and gripping performance. The TPE sheet of film is embossed with the above-mentioned features using but not limited to a cast extrusion method followed by a heat-sealing method. The heat-sealing method refers to a method used to produce a hand shaped glove by sealing two layers of sheet of films together.

The following example is constructed to illustrate the present invention in a non-limiting sense.

Thermoplastic Elastomer (TPE) Film Formulation

Table 1 summarizes formulation of the sheet of film used for producing the TPE film.

TABLE 1

Formulation of thermoplastic elastomer film

| Ingredients | Working range (Weight %) | Preferred range (Weight %) | Typical Value (Weight %) |
| --- | --- | --- | --- |
| Low density polyethylene (LDPE) | 10.00 to 40.00 | 20.00 to 30.00 | 25.00 |
| Metallocene linear low-density polyethylene (m-LLDPE) | 20.00 to 80.00 | 40.00 to 60.00 | 50.00 |
| Thermoplastic olefin (TPO) | 10.00 to 40.00 | 20.00 to 30.00 | 24.50 |
| Amide | 0.01 to 2.00 | 0.10 to 1.00 | 0.50 |

As seen in Table 1, the formulation of the sheet of film used for producing the TPE film comprises 10.00% to 40.00% by weight of LDPE, 20.00% to 80.00% by weight of m-LLDPE, 10.00% to 40.00% by weight of TPO and 0.01% to 2.00% by weight of amide. The LDPE is the main component of the TPE film. The m-LLDPE plays a role in providing strength and seal ability to the TPE film used for producing the glove. The m-LLDPE may be replaced by Ziegler-Natta LLDPE. TPO provides elasticity to the TPE film and the TPO used is ethylene-α-olefin copolymer. Lastly, amide provides donning efficiency when the TPE film is used for thin film articles such as gloves. Amide may be replaced by erucamide.

Method of Preparing the Embossed TPE Glove

The TPE glove with embossments is produced by transferring the embossments on the sheet of film using a series of rollers during a conventional cast extrusion method. The embossed film is then sealed into a TPE glove using a heat-sealing method.

The method is not limited to cast extrusion method using a single screw extruder. The extrusion temperature ranges between 150° C. to 280° C., preferably 170° C. to 260° C. Meanwhile, the heat-sealing temperature ranges between 280° C. to 380° C., preferably 330° C. to 350° C. The heat-sealing speed ranges between 110 seal/min to 160 seal/min, preferably between 125 seal/min to 140 seal/min.

The TPE glove with embossment of the present invention was tested for durability and gripping performance using different depths ($D_r$) of the recessed area (104). The outcome is tabulated in Table 2. The mechanical properties were tested under ASTM D412-16 that covers but is not limited to tensile strength and elongation. The gripping performance was tested in the terms of static coefficient of friction (COF) under ASTM D1894 and tackiness. Lastly, the durability was tested using finger rubbing test.

TABLE 2

Outcome of mechanical properties, durability and gripping performance of an embossed TPE glove

| Variable | Depth of recessed area | | | | |
| --- | --- | --- | --- | --- | --- |
| | 0% | 70% | 80% | 90% | 100% |
| Tensile strength (MPa) | 21.52 | 21.63 | 22.13 | 22.09 | 21.89 |
| Elongation (%) | 609 | 590 | 589 | 591 | 587 |
| Static COF | 0.21 | 0.25 | 0.67 | 0.68 | 0.86 |
| Tackiness (max °) | 40 | 40 | 60 | 60 | 70 |
| Durability (times) | >50 | >50 | ≤50 | 10 to 50 | <15 |
| Thickness of film before emboss (μm) | 35 | 35 | 35 | 35 | 35 |

The measurement for static COF, tackiness and durability were conducted on the exterior side of the glove or the contact surface between the glove and the object. Higher static COF refers to better tackiness and gripping performance. A higher angle in tackiness refers to better gripping performance as well. Meanwhile, the durability as stated in Table 2 refers to number of rubbing between thumb and index finger. A higher value for durability is considered preferable as it is able to withstand frictional motion and has resistance from tearing during the process. The durability of TPE glove on actual application whereby the glove was subjected to continuous rubbing between an object and the TPE glove.

Based on Table 2, it is seen that the present invention is able to produce a wide range of depths ($D_r$) in the recessed area (104) that produces varying results in terms of gripping performance which was evaluated in terms of static coefficient of friction (COF) and tackiness, correlating with durability of the TPE glove. It is also seen that by controlling the depth ($D_r$) of the recessed area (104), the mechanical properties of the TPE glove were not affected but the durability and gripping performance were changed significantly.

Further, tests in Table 2 show optimum results when the depth ($D_r$) of the recessed area (104) is between 80% and 90%. Thus, embossment with 80% and 90% recess provides a balance in both durability and gripping performance of the TPE glove.

Furthermore, the thickness of the sheet of film before embossment is controlled between the range of 25 μm to 60 μm, preferably between 32 μm to 38 μm and most preferably 35 μm. Controlling the thickness of the sheet of film before embossment is essential as any thickness below 25 μm will have poor durability or any thickness above 60 μm will result in defects on the glove due to presence of cracking lines on the film or the embossing overlaid on the film is not significant. Hence, the texture produced may not provide the durability and gripping performance as intended by the invention.

As a whole, the features of the embossment designed according to the present invention are able to overcome the imbalance between durability and gripping performance in thermoplastic elastomer (TPE) gloves.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups therefrom. The term "between", particularly in the context of numerical values or the like within a recited range, includes the endpoints of such recited range.

The method steps, processes, and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

The invention claimed is:

1. An embossment (100) formed on a sheet thermoplastic elastomer film, wherein the embossment (100) comprises:
   (i) a base surface (103);
   (ii) a raised surface (102) opposite to the base surface (103) and located at a distance from the base surface (103); and
   (iii) at a recessed area (104) from the raised surface (102);
   wherein:
   a design of the embossment (100) and the recessed area (104) is at least one shape;
   height ($H_e$) of the embossment (100) is the distance between the base surface (103) and the raised surface (102);
   the recessed area (104) is located at a depth ($D_r$) is between 80% to 99% relative to height ($H_e$) of the embossment (100) and measured between the raised surface (102) and a surface opposite to surface of the recessed area (104);
   the recessed area (104) defines a void from surface of the recessed area (104) toward the raised surface (102) and the raised surface (102) defines a void from a surface opposite to and corresponding to the raised surface (102) towards the base surface (103 wherein the void beneath the raised surface (102) is delimited by a non-embossed area (101).

2. The embossment (100) as claimed in claim 1, wherein length of the embossment (100) measured from an outermost edge of the embossment (100) to an opposite outermost edge of the embossment (100) is between 0.10 mm and 10.00 mm.

3. The embossment (100) as claimed in claim 1, wherein length of the recessed area (104) measured from an outermost edge of the recessed area (104) to an opposite outermost edge of the recessed area (104) is between 0.05 mm and 5.00 mm.

4. The embossment (100) as claimed in claim 1, wherein the shape is selected from the group consisting of circle, square, rectangle, diamond, hexagon, octagon or combinations thereof.

5. The embossment (100) as claimed in claim 1, wherein the depth ($D_r$) of the recessed area (104) is between 80% to 90% relative to the height ($H_e$) of the embossment (100).

6. The embossment (100) as claimed in claim 1, wherein thickness of the sheet of film before embossment is between 25 μm to 60 μm.

7. A glove produced from the sheet of film having at least one embossment (100) according to claim 1.

8. The embossment (100) as claimed in claim 1, further comprising a sub-recessed area recessed from the surface of the recessed area (104).

\* \* \* \* \*